US011148187B2

(12) United States Patent
Hirayama et al.

(10) Patent No.: US 11,148,187 B2
(45) Date of Patent: Oct. 19, 2021

(54) METHOD FOR MANUFACTURING A GEAR

(71) Applicant: TOYOTA JIDOSHA KABUSHIKI KAISHA, Toyota (JP)

(72) Inventors: Masanobu Hirayama, Toyota (JP); Takahide Katagiri, Toyota (JP); Yugo Tsutsumi, Kariya (JP); Manabu Hirose, Okazaki (JP); Yasuhiro Katsukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 141 days.

(21) Appl. No.: 16/240,824

(22) Filed: Jan. 7, 2019

(65) Prior Publication Data

US 2019/0262891 A1    Aug. 29, 2019

(30) Foreign Application Priority Data

Feb. 23, 2018    (JP) .............................. JP2018-030331

(51) Int. Cl.
*B21K 1/30*    (2006.01)
*B21H 5/02*    (2006.01)
(Continued)

(52) U.S. Cl.
CPC ............. *B21H 5/027* (2013.01); *B21H 5/022* (2013.01); *B21K 1/30* (2013.01); *B22F 5/08* (2013.01);
(Continued)

(58) Field of Classification Search
CPC .......... B21H 5/027; B21H 5/022; B21H 5/00; B23F 19/00; B21K 1/30; B22F 5/08; B22F 2998/10; F16H 55/16; B21C 23/14
See application file for complete search history.

(56) References Cited

U.S. PATENT DOCUMENTS

| 3,631,704 A | 1/1972 | Leonard et al. |
| 5,711,187 A * | 1/1998 | Cole ..................... B21H 5/022 |
| | | 29/893.32 |
| 2004/0219051 A1 | 11/2004 | Sonti et al. |

FOREIGN PATENT DOCUMENTS

| JP | S52-20946 B | 6/1977 |
| JP | 62-57726 A | 3/1987 |

(Continued)

OTHER PUBLICATIONS

Combined Chinese Office Action and Search Report dated Sep. 2, 2020, in the corresponding Chinese Patent Application No. 201910132177.X (with English Translation and English Translation of Category of Cited Documents), 21 pages.

(Continued)

*Primary Examiner* — Rick K Chang
(74) *Attorney, Agent, or Firm* — Oblon, McClelland, Maier & Neustadt, L.L.P.

(57) ABSTRACT

A method for manufacturing a gear which effectively prevent a crack from occurring inside a tooth part when rolling processing is performed on a teeth part of a gear raw material is achieved. A method according to one embodiment for manufacturing a gear by performing rolling processing on a tooth part of a sintered gear raw material. The method includes, when the rolling processing is performed on the tooth part of the gear raw material, pressing the gear raw material toward a center of rotation of the gear raw material by a rolling machine and, when at least the rolling processing is performed on the tooth part of the gear raw material toward a center of a thickness thereof by a pressing machine, pressing a region where an internal density of the tooth part of the gear raw material decreases.

2 Claims, 12 Drawing Sheets

(51) Int. Cl.
*B22F 5/08* (2006.01)
*F16H 55/16* (2006.01)
*B23F 19/00* (2006.01)

(52) U.S. Cl.
CPC ............. *B23F 19/00* (2013.01); *F16H 55/16* (2013.01); *B22F 2998/10* (2013.01)

(56) References Cited

FOREIGN PATENT DOCUMENTS

| | | |
|---|---|---|
| JP | H2-155528 A | 6/1990 |
| JP | H06-501988 A | 3/1994 |
| JP | 2006-523775 | 10/2006 |
| JP | 2015-203128 | 11/2015 |
| WO | WO 2005/058524 A1 | 6/2005 |
| WO | WO 2015/124708 A1 | 8/2015 |

OTHER PUBLICATIONS

"Sliding Motion of Contact Points on Driven Side", "Flow Analysis of Tooth Profile Materials", Song Jianli et al., "Theory and Technology of Cold Rolling Precision Forming for Shaft Parts" [M]. Beijing: National Defense Press, Dec. 31, 2013, pp. 30-34.

"Sliding Motion of Contact Points on Driven Side", "Flow Analysis of Tooth Profile Materials", Song Jianli et al., "Theory and Technology of Cold Rolling Precision Forming for Shaft Parts" [M]. Beijing: National Defense Press, Dec. 31, 2013, pp. 82-83.

\* cited by examiner

METHOD FOR MANUFACTURING A GEAR

CROSS REFERENCE TO RELATED APPLICATIONS

This application is based upon and claims the benefit of priority from Japanese patent application No. 2018-30331, filed on Feb. 23, 2018, the disclosure of which is incorporated herein in its entirety by reference.

BACKGROUND

The present disclosure relates to a method and an apparatus for manufacturing a gear. For example, the present disclosure relates to a method and an apparatus for manufacturing a gear by performing rolling processing on a tooth part of a sintered gear raw material.

Commonly, rolling processing is performed on a sintered gear raw material to densify a tooth surface density. For example, the method for manufacturing a gear disclosed in Japanese Unexamined Patent Application Publication No. 2015-203128 achieves densification of a tooth surface density by rolling processing and rolls tooth parts of a gear raw material to improve the circularity of the tooth parts in such a way that a rolling margin of teeth bottoms becomes larger than a rolling margin of teeth tips.

SUMMARY

The applicant has found the following problem. When rolling processing is performed on the tooth parts of the gear raw material, a load acts on the tooth surface as shown in FIG. 12. At this time, a material inside the tooth parts flows to a tooth tip side and a tooth bottom side. Then, as shown in FIG. 12, the density in the vicinity of a center position C of a tooth height inside the tooth parts decreases, and a crack may occur inside the tooth part. Note that in FIG. 12, the density is shown such that the darker the color is, the higher the density becomes.

The present disclosure has been made in view of such a problem. An object of the present disclosure is to provide a method and an apparatus for manufacturing a gear which effectively prevent a crack from occurring inside tooth parts when rolling processing is performed on tooth parts of a gear raw material.

An example aspect of the present disclosure is a method for manufacturing a gear by performing rolling processing on a tooth part of a sintered gear raw material.

The method includes, when the rolling processing is performed on the tooth part of the gear raw material, pressing the gear raw material toward a center of rotation of the gear raw material by a rolling machine and, when at least the rolling processing is performed on the tooth part of the gear raw material toward a center of a thickness thereof by a pressing machine, pressing a region where an internal density of the tooth part of the gear raw material decreases.

This makes it possible to press the region where the internal density of the tooth part of the gear raw material decreases at least when the rolling processing is performed, thereby effectively preventing a crack from occurring inside the tooth part when the rolling processing is applied to the tooth part of the gear raw material.

In the above method, a pressing force by the pressing machine is preferably applied to one side of a surface of the gear raw material in a thickness direction and another side of the surface of the gear raw material in the thickness direction in such a way that the gear raw material is sandwiched therebetween.

This reduces a depth (an amount of pushing) by which the tooth part of the gear raw material is pressed from each side of the gear raw material in the thickness direction as compared with a case when the tooth part of the gear raw material is pressed from one side of the gear raw material in the thickness direction.

In the above method, the pressing force is preferably applied to a center position of a tooth height of the tooth part of the gear raw material.

The region where the internal density of the tooth part of the gear raw material decreases when the rolling processing is performed is located in the vicinity of the center position of the tooth height of the tooth part of the gear raw material. It is thus possible to locally press the region.

Another example aspect of the present disclosure is an apparatus for manufacturing a gear by performing rolling processing on a tooth part of a sintered gear raw material.

The apparatus includes:
  a rolling machine configured to press the gear raw material toward a center of rotation of the gear raw material in order to perform the rolling processing on the tooth part of the gear raw material; and
  a pressing machine configured to press a region where an internal density of the tooth part of the gear raw material decreases when at least the rolling processing is performed on the tooth part of the gear raw material toward a center of a thickness thereof.

This makes it possible to press the region where the internal density of the tooth part of the gear raw material decreases at least when the rolling processing is performed, thereby effectively preventing a crack from occurring inside the tooth part when the rolling processing is applied to the tooth part of the gear raw material.

In the above apparatus, the pressing machine includes:
  a first pressing unit configured to apply a pressing force toward a center of a thickness of the gear raw material from one side of a surface of the gear raw material in a thickness direction; and
  a second pressing unit configured to apply a pressing force toward a center of a thickness of the gear raw material from another side of the surface of the gear raw material in the thickness direction.

The first pressing unit and the second pressing unit are preferably arranged to sandwich the gear raw material.

This reduces a depth (an amount of pushing) by which the tooth part of the gear raw material is pressed by both of the pressing units as compared with a case when the tooth part of the gear raw material is pressed by only one pressing unit. Thus, the first pressing unit and the second pressing unit can be downsized.

In the above apparatus, the pressing machine preferably applies the pressing force by the pressing machine at a center position of a tooth height of the tooth part of the gear raw material.

The region where the internal density of the tooth part of the gear raw material decreases when the rolling processing is performed is located in the vicinity of the center position of the tooth height of the tooth part of the gear raw material. It is thus possible to locally press the region.

In the above apparatus, a tooth bottom of the tooth part of the rolling machine for rolling the gear raw material into a tooth shape is preferably formed in such a way that it is not brought into contact with a tooth tip of the gear raw material immediately after the rolling processing by the rolling machine is started.

This reduces a load on the rolling machine.

According to the present disclosure, it is possible to effectively prevent a crack from occurring inside tooth parts when rolling processing is performed on the tooth parts of a gear raw material.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present disclosure is not limited to the following embodiments. Further, the following descriptions and drawings are simplified as appropriate in order to clarify the descriptions.

First Embodiment

Figure 1:
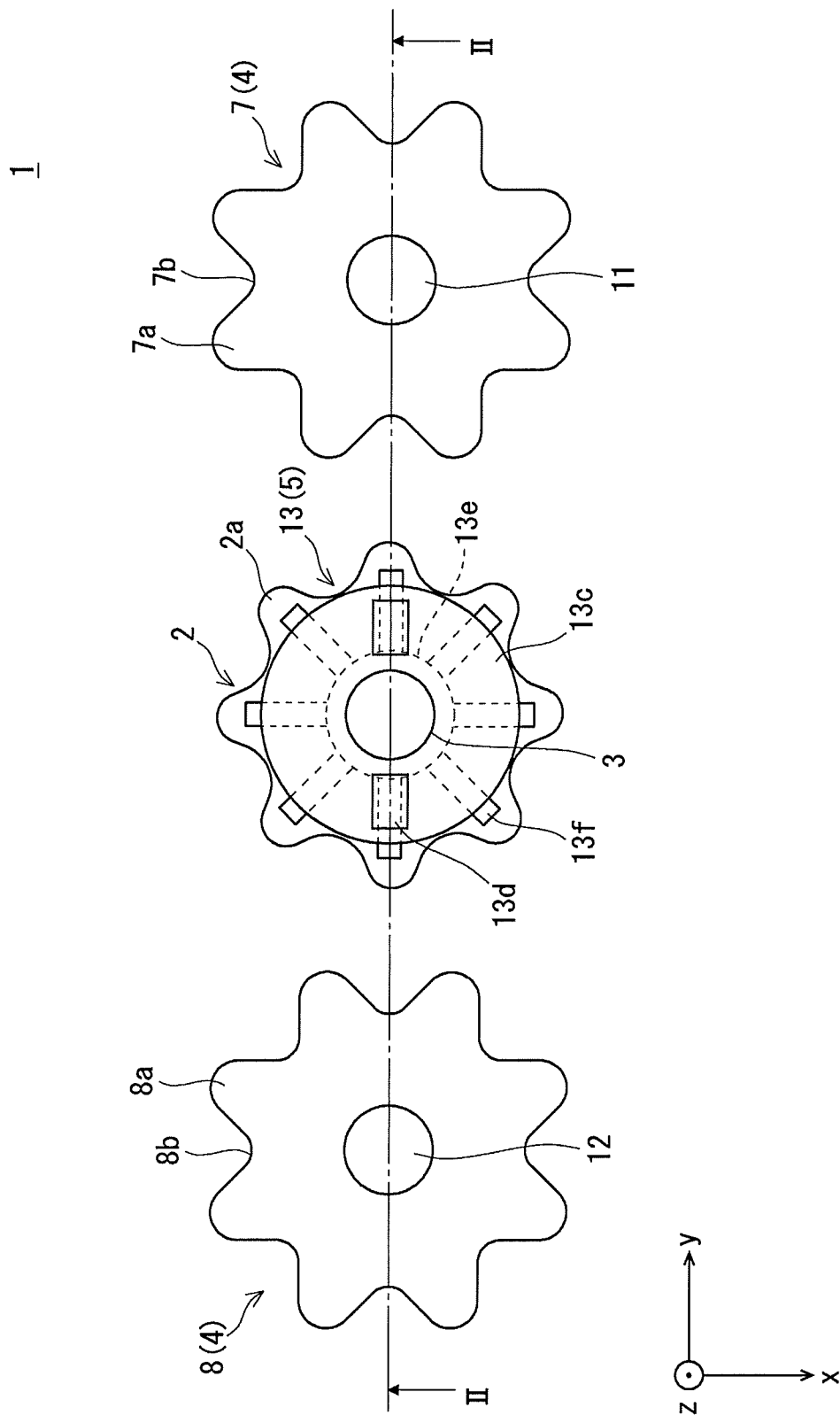
FIG. 1 is a plan view schematically showing an apparatus for manufacturing a gear according to a first embodiment.
Figure 2:
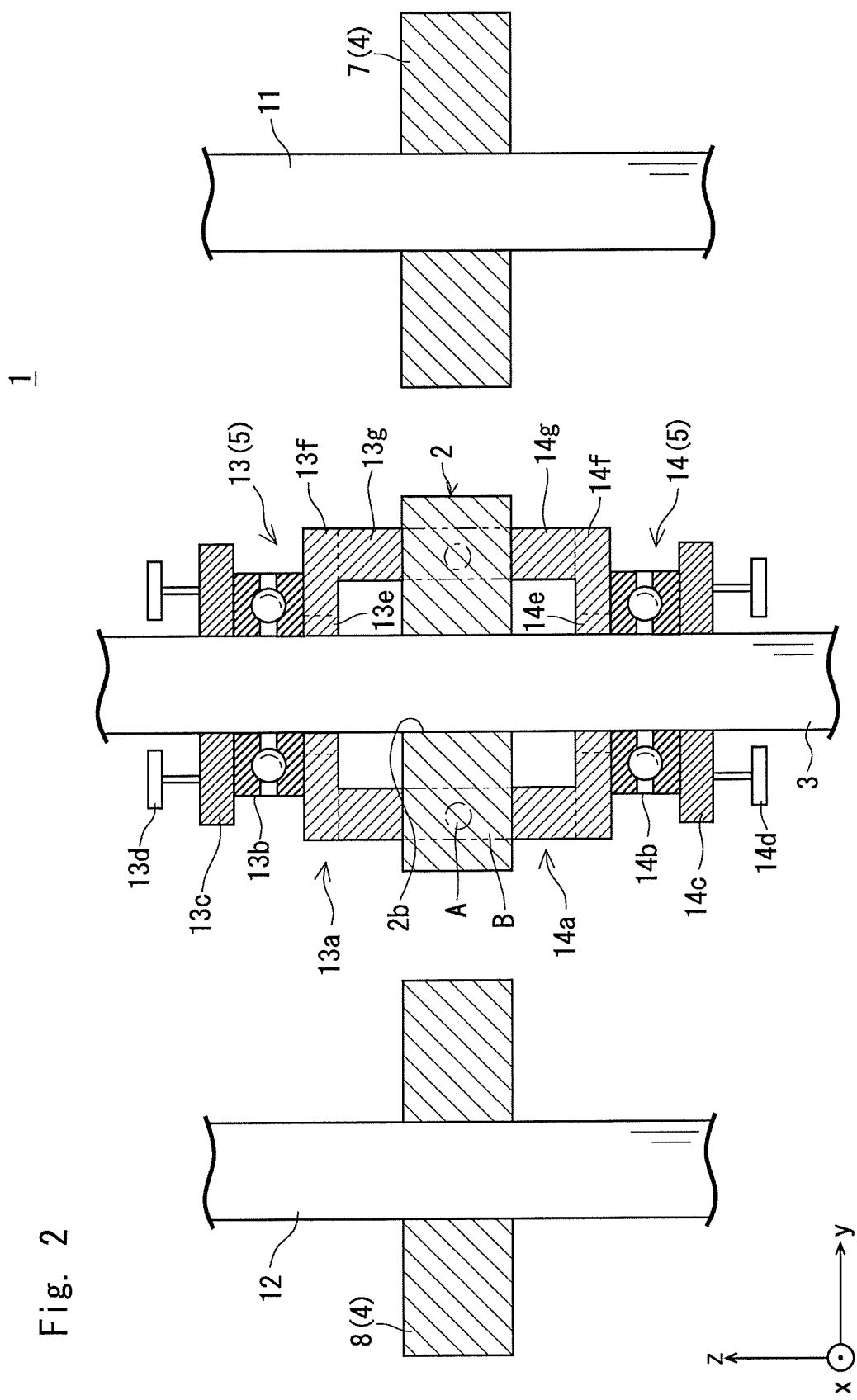
FIG. 2 is a partial cross-sectional view taken along the line 11-11 of FIG. 1.
Figure 3:
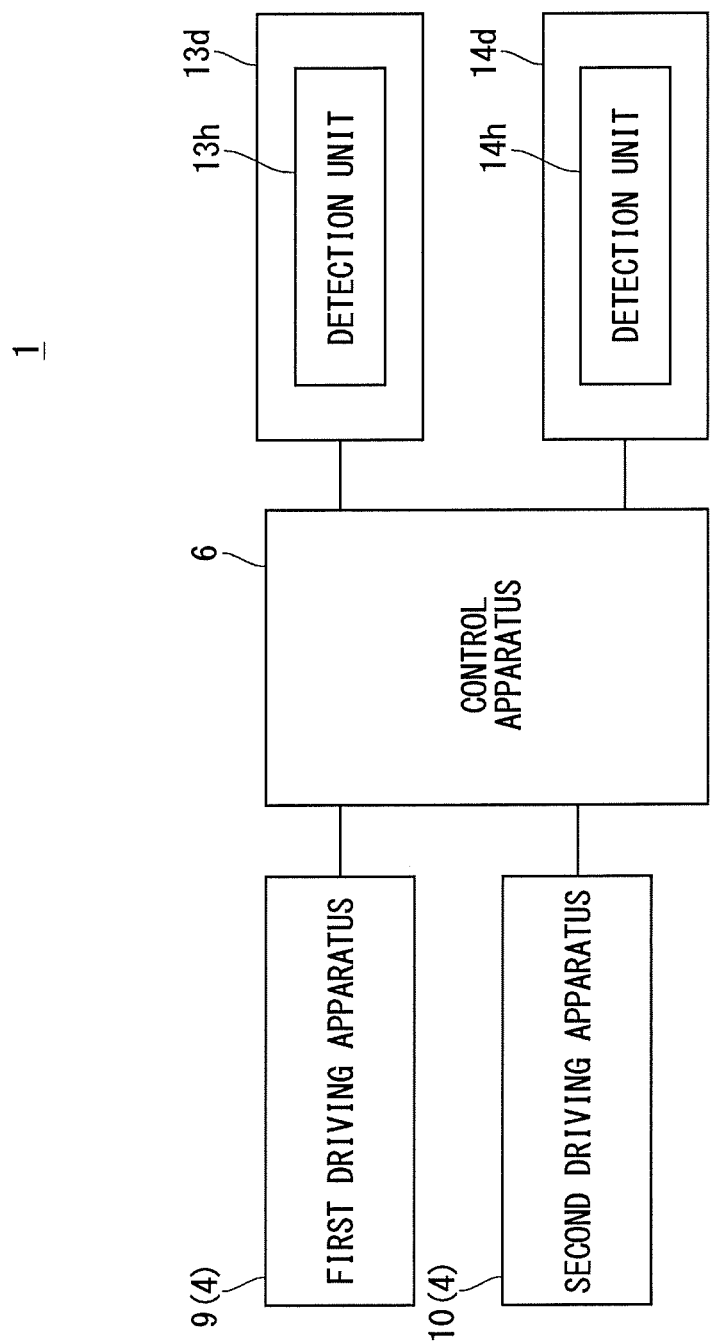
FIG. 3 is a block diagram showing a control system of the apparatus for manufacturing a gear according to the first embodiment.

First, a configuration of an apparatus for manufacturing a gear according to this embodiment will be briefly described. FIG. 1 is a plan view schematically showing the apparatus for manufacturing a gear according to this embodiment. FIG. 2 is a partial cross-sectional view taken along the line II-II of FIG. 1. FIG. 3 is a block diagram showing a control system of the apparatus for manufacturing a gear according to this embodiment. The following descriptions will be given using a three-dimensional (XYZ) coordinate system in order to clarity the descriptions. Further, in the following descriptions, it is assumed that a gear raw material on which rolling processing is to be performed is disposed on the apparatus for manufacturing a gear.

As shown in FIGS. 1 and 2, an apparatus 1 for manufacturing a gear according to this embodiment (hereinafter sometimes abbreviated simply as a manufacturing apparatus) can be preferably used when a gear is manufactured by performing rolling processing on tooth parts 2a of a sintered gear raw material 2. A gear raw material 2 here is a sintered gear obtained by sintering a powder compact. The gear raw material 2 includes a plurality of tooth parts 2a formed on an outer periphery thereof and a shaft hole 2b formed at the center thereof.

As shown in FIGS. 1 to 3, the manufacturing apparatus 1 includes, for example, a support shaft 3, a rolling machine 4, a pressing machine 5, and a control apparatus 6. The support shaft 3 extends in a Z-axis direction and passed through a shaft hole 2b of the gear raw material 2.

The rolling machine 4 presses the gear raw material 2 toward a center of rotation of the gear raw material 2 in order to roll the tooth parts 2a of the gear raw material 2 into a preset tooth shape. For example, as shown in FIGS. 2 and 3, the rolling machine 4 includes a first rolling die 7, a second rolling die 8, a first driving apparatus 9, and a second driving apparatus 10.

As shown in FIG. 1, the first rolling die 7 has a gear shape including a plurality of tooth parts 7a on its outer peripheral surface in order to roll the tooth parts 2a of the gear raw material 2 into the preset tooth shape. Then, the first rolling die 7 is disposed on the Y axis+side of the gear raw material 2, and rotates according to the rotation of the rotating shaft 11 extending in the Z-axis direction.

The second rolling die 8 has a shape substantially equal to that of the first rolling die 7. As shown in FIG. 1, the second rolling die 8 has a gear shape including a plurality of tooth parts 8a on its outer peripheral surface in order to roll the tooth parts 2a of the gear raw material 2 into the preset tooth shape. The second rolling die 8 is disposed on the Y axis−side of the gear raw material 2, and rotates according to the rotation of the rotating shaft 12 extending in the Z-axis direction. The first rolling die 7 and the second rolling die 8 are disposed in such a way that they sandwich the gear raw material 2 to be rolled in the Y-axis direction.

The first driving apparatus 9 moves the first rolling die 7 in the Y-axis direction and rotates the first rolling die 7. Such an operation of the first rolling die 7 can be achieved by, for example, the first driving apparatus 9 driving the rotating shaft 11 of the first rolling die 7.

The second driving apparatus 10 moves the second rolling die 8 in the Y-axis direction and rotates the second rolling die 8. Such an operation of the second rolling die 8 can be achieved by, for example, the second driving apparatus 10 driving the rotating shaft 12 of the second rolling die 8.

The pressing machine 5 presses the gear raw material 2 toward a center of the gear raw material 2 in the thickness direction (the Z-axis direction). As shown in FIG. 2, the pressing machine 5 includes, for example, a first pressing unit 13 and a second pressing unit 14.

The first pressing unit 13 is disposed on the Z axis+side of the gear raw material 2. The first pressing unit 13 includes a punching unit 13a, a bearing 13b, a transmission plate 13c, and pressurizing units 13d.

The punching unit 13a presses the surface of the gear raw material 2 on the Z axis+side. For example, the punching unit 13a presses a preset region of the tooth parts 2a of the gear raw material 2 from the Z axis+side, which will be described later in detail. The punching unit 13a includes a ring unit 13e, arm units 13f, and protrusion units 13g.

The ring unit 13e has an annular shape, and the support shaft 3 is rotatably passed through the center thereof. The arm unit 13f radially extends from the center of the ring unit 13e toward each tooth part 2a of the gear raw material 2. One end of the arm unit 13f is fixed to the ring unit 13e. That is, the number of arm units 13f is appropriately changed according to the number of teeth of the gear raw material 2.

Figure 4:
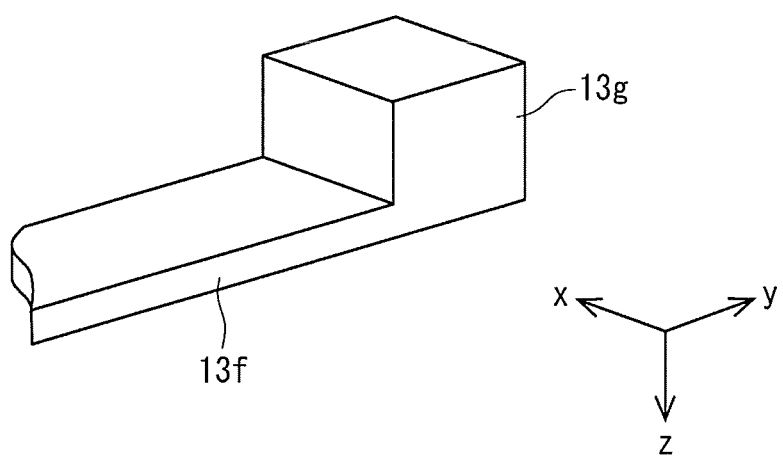
FIG. 4 is a perspective view showing an example of a periphery of a protrusion unit of a pressing machine according to the first embodiment.

The protrusion unit 13g is brought into contact with the surface of the tooth part 2a of the gear raw material 2 on the Z axis+side and presses the tooth parts 2a. FIG. 4 is a perspective view showing an example of a periphery of the protrusion unit of the pressing machine according to this embodiment. FIG. 4 shows an example of one protrusion unit. As shown in FIG. 4, the protrusion unit 13g protrudes from the other end of the arm unit 13f toward the Z-axis−side, and has a rectangular shape when viewed from the Z-axis direction.

As shown in FIG. 2, the bearing 13b is disposed on the Z axis+side of the punching unit 13a, and is, for example, a thrust bearing. That is, the bearing 13b has a configuration in which a spherical body is sandwiched between annular shaped washers, and the support shaft 3 is rotatably passed through the inside of the bearing 13b. Alternatively, the bearing 13b may have a configuration in which a rotating body such as a cylindrical body is used instead of a spherical body in a manner similar to a common thrust bearing.

As shown in FIG. 2, the transmission plate 13c is disposed on the Z axis+side of the bearing 13b and together with the punching unit 13a sandwiches the bearing 13b. For example, as shown in FIG. 1, the transmission plate 13c has an annular shape, and the support shaft 3 is rotatably passed through the inside of the transmission plate 13c. However, the transmission plate 13c may have any shape as long as it is substantially in surface contact with the entire surface of the washer on the Z axis+side, which is on the Z axis+side of the bearing 13b.

The pressurizing units 13d press the punching unit 13a in the Z-axis direction via the transmission plate 13c and the bearing 13b. The pressurizing unit 13d is, for example, an air cylinder and a hydraulic cylinder and includes a detection unit 13h for detecting an amount of pushing.

The pressurizing units 13d are disposed at an approximately equal angle around the support shaft 3. For example, in the example of FIG. 1, the pressurizing units 13d are disposed with a spacing of 180° from each other around the support shaft 3. However, the pressurizing units 13d may be disposed in such a way that the punching unit 13a can be pushed substantially equally in the Z-axis direction via the transmission plate 13c and the bearing 13b.

As shown in FIG. 2, the second pressing unit 14 has a configuration in which the first pressing unit 13 is inverted around the Y axis. That is, the second pressing unit 14 includes a punching unit 14a, a bearing 14b, a transmission plate 14c, and pressurizing units 14d, repeated descriptions of which are omitted though. The punching unit 14a includes a ring unit 14e, arm units 14f, and protrusion units 14g. The pressurizing unit 14d includes a detecting unit 14h. At this time, the protrusion unit 13g of the punching unit 13a and the protrusion unit 14g of the punching unit 14a face each other in the Z-axis direction.

The control apparatus 6 controls the first driving apparatus 9 and the second driving apparatus 10 to perform rolling processing on the gear raw material 2 by the first rolling die 7 and the second rolling die 8. Further, the control apparatus 6 controls the pressurizing units 13d and 14d based on the detection results of the detection units 13h and 14h in such a way that the punching units 13a and 14a can press the gear raw material 2 at a predetermined depth.

Figure 5:
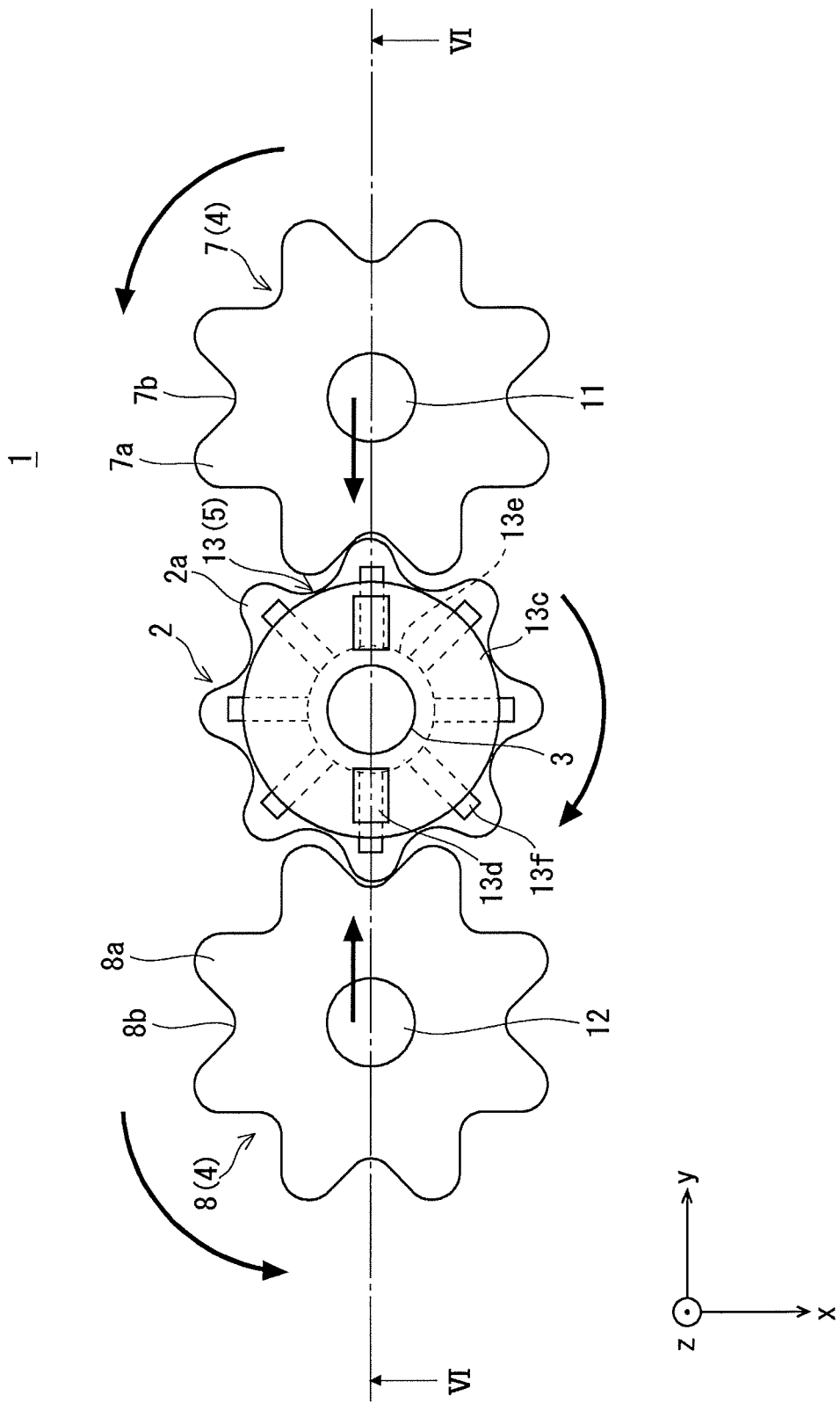
FIG. 5 is a plan view showing a state in which rolling processing is performed on a gear raw material in the method for manufacturing a gear according to the first embodiment.
Figure 6:
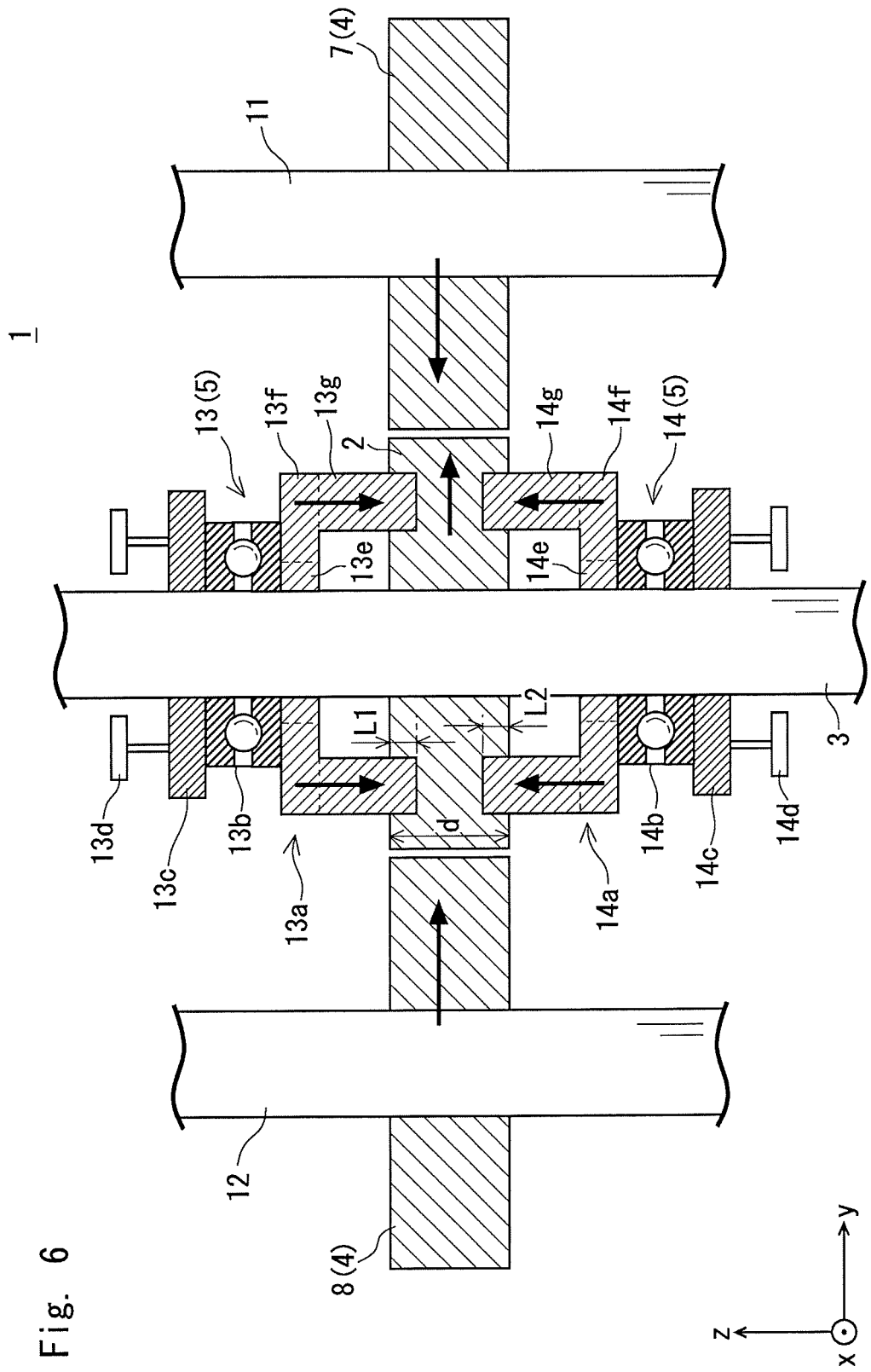
FIG. 6 is a partial cross-sectional view taken along the line VI-VI of FIG. 5.
Figure 7:
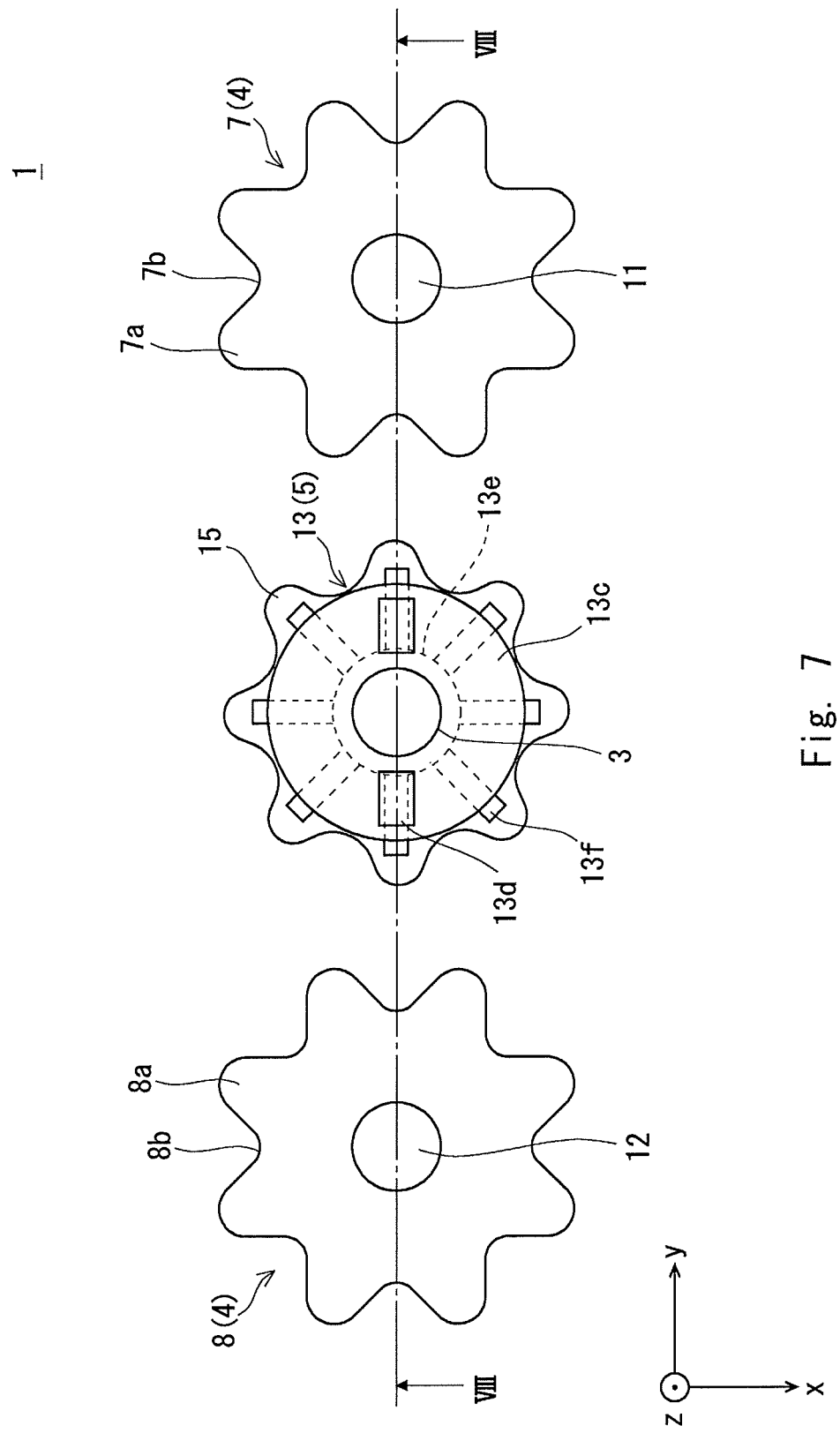
FIG. 7 is a plan view showing a state after the rolling processing is performed on the gear raw material in the method for manufacturing a gear according to the first embodiment.
Figure 8:
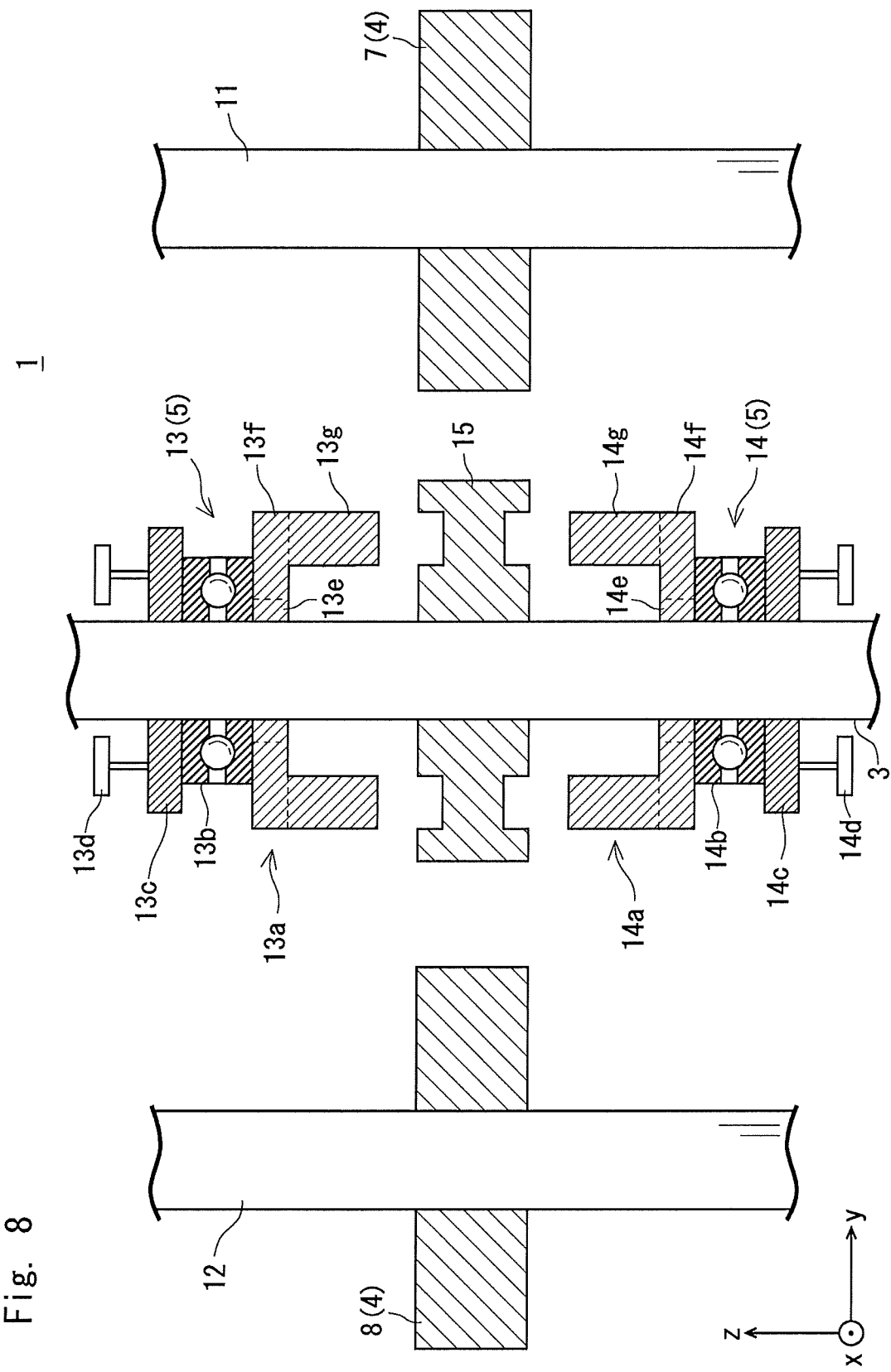
FIG. 8 is a partial cross-sectional view taken along the line VIII-VIII of FIG. 7.

Next, a method for manufacturing a gear according to this embodiment will be described. The method for manufacturing a gear according to this embodiment can be achieved by executing a program in the control apparatus 6. FIG. 5 is a plan view showing a state in which the rolling processing is performed on a gear raw material in the method for manufacturing a gear according to this embodiment. FIG. 6 is a partial cross-sectional view taken along the line VI-VI of FIG. 5. FIG. 7 is a plan view showing a state after the rolling processing is performed on the gear raw material in the method for manufacturing a gear according to this embodiment. FIG. 8 is a partial cross-sectional view taken along the line VIII-VIII of FIG. 7.

In a state in which the first pressing unit 13 is pulled out from the support shaft 3, the gear raw material 2 is passed through the support shaft 3, and then the first pressing unit 13 is passed through the support shaft 3 in such a way that the gear raw material 2 is sandwiched between the first pressing unit 13 and the second pressing unit 14. A state at this time is described below.

First, as shown in FIGS. 5 and 6, the control apparatus 6 controls the first driving apparatus 9 and the second driving apparatus 10 to bring the first rolling die 7 and the second rolling die 8 close to the gear raw material 2 so that the first rolling die 7 and the second rolling die 8 are meshed with the gear raw material 2.

Next, the control apparatus 6 controls the first driving apparatus 9 to rotate the first rolling die 7 while pushing the first rolling die 7 toward the Y axis−side, and also controls the second driving apparatus 10 to rotate the second rolling die 8 while pushing the second rolling die 8 toward the Y axis+side.

Then, the gear raw material 2 also rotates, the rolling processing is performed on the tooth parts 2a of the gear raw material 2 by the first rolling die 7 and the second rolling die 8, thereby densifying the surfaces of the tooth parts 2a. At this time, the rotation of the punching unit 13a, the gear raw material 2, and the punching unit 14a is allowed by the bearings 13b and 14b.

As described above, when the rolling processing is performed on the tooth parts 2a of the gear raw material 2, the material inside the tooth parts 2a flows to the tooth tip side and the tooth bottom side. This may cause a crack to occur inside the tooth parts 2a of the gear raw material 2.

Thus, the control apparatus 6 controls the pressurizing units 13d and 14d in such a way that, when viewed from the Z-axis direction, the protrusion units 13g of the punching unit 13a and the protrusion units 14g of the punching unit 14a sandwich a region B including a region A. In the region A, an internal density of the tooth parts 2a decreases when at least the rolling processing is performed on the tooth parts 2a of the gear raw material 2. Note that in FIG. 2, the region A is indicated by a one-dot chain line in which the internal density of the tooth parts 2a of the gear raw material 2 decreases when the rolling processing is performed, while the region B is indicated by a two-dot chain line including the region A.

At this time, the control apparatus 6 controls the pressurizing units 13d and 14d in such a way that the protrusion units 13g of the punching unit 13a and the protrusion units 14g of the punching unit 14a press the gear raw material 2 at a preset depth according to the detection results of the detection units 13h and 14h.

The internal density of the region A becomes less than or equal to a preset target density in the tooth parts 2a when the rolling processing is performed on the tooth parts 2a of the gear raw material 2. The region A can be set by detecting the internal density of the rolled tooth parts 2a of the gear raw material 2 through, for example, an experiment and a simulation. The region A is located, for example, in the vicinity of a center position of a tooth height of the tooth parts 2a of the gear raw material 2.

The preset depth is set in such a way that the density of the region in the tooth part 2a of the gear raw material 2 pressed by the protrusion units 13g of the punching unit 13a and the protrusion units 14g of the punching unit 14a becomes higher than the preset target density.

For example, the density of the region where a crack has occurred inside the tooth part 2a is detected based on the internal density of the tooth parts 2a of the gear raw material 2 detected in the manner described above. Then, the depth at which the tooth part 2a of the gear raw material 2 is pressed by the protrusion units 13g of the punching unit 13a and the protrusion units 14g of the punching unit 14a is set based on the <Formula 1>.

$$L1+L2=(1-\rho/\rho')d \qquad \text{<Formula 1>}$$

In this formula, L1 is a depth (mm) at which the tooth parts 2a of the gear raw material 2 are pressed by the protrusion units 13g of the punching unit 13a, L2 is the depth (mm) at which the tooth parts 2a of the gear raw material 2 is pressed by the protrusion units 14g of the punching unit 14a, $\rho$ is the density (kg/m$^3$) of the region where a crack has occurred inside the tooth part 2a, $\rho'$ is the target density (kg/m$^3$), and d is a thickness (tooth width: mm) of the tooth part 2a of the gear raw material 2 in the Z-axis direction.

Next, when the rolling processing on the tooth parts 2a of the gear raw material 2 by the first rolling die 7 and the second rolling die 8 is completed (e.g., the first rolling die 7 and the second rolling die 8 are rotated at a preset rotation number) and the pressing of the gear raw material 2 at the predetermined depth by the protrusion units 13g of the punching unit 13a and the protrusion units part 14g of the punching unit 14a is completed, the control apparatus 6 controls, as shown in FIGS. 7 and 8, the first driving apparatus 9 and the second driving apparatus 10 in such a way that the first rolling die 7 and the second rolling die 8 are separated from the gear raw material 2. Further, when the control apparatus 6 controls the pressurizing units 13d and 14d to separate the punching units 13a and 14a from the gear raw material 2, a gear 15 can be manufactured.

After that, for example, when the first pressing unit 13 is pulled out from the support shaft 3, the gear 15 can be pulled out from the support shaft 3.

As described above, the method for manufacturing a gear and manufacturing apparatus 1 according to this embodiment press the region A, in which the internal density of the tooth parts 2a decreases when the rolling processing is performed on the tooth parts 2a of the gear raw material 2, thereby effectively preventing the density of the region A from decreasing and consequently a crack from occurring inside the tooth parts 2a.

Moreover, in the method for manufacturing a gear and manufacturing apparatus 1 according to this embodiment, the protrusion units 13g of the punching unit 13a and the protrusion units 14g of the punching unit 14a press the tooth parts 2a of the gear raw material 2 in such a way that they sandwich the tooth parts 2a. By doing so, the depth (an amount of pushing) by which the tooth parts 2a of the gear raw material 2 are pressed by the punching units 13a and 14a can be made smaller than when one of the punching units presses the tooth parts 2a of the gear raw material 2. Thus, the pressurizing units 13d and 14d can be downsized.

The region A in which the internal density of the tooth part 2a decreases when the rolling processing is performed on the tooth parts 2a of the gear raw material 2 is located in the vicinity of the center position in the tooth height direction of the tooth part 2a of the gear raw material 2. Thus, the method for manufacturing a gear and manufacturing apparatus 1 according to this embodiment locally press the region A. Hence, the pressurizing units 13d and 14d can be downsized as compared with the case where the entire area of the tooth parts 2a of the gear raw material 2 is pressed in the Z-axis direction.

As shown in FIG. 5, in order to perform the rolling processing on the gear raw material 2 by the first rolling die 7 and the second rolling die 8, it is preferable that tooth bottoms 7b of the tooth parts 7a of the first rolling die 7 and tooth bottoms 8b of the tooth parts 8a of the second rolling die 8 not be brought in contact with tooth tips of the tooth part 2a of the gear raw material 2 while the first rolling die 7 and the second rolling die 8 are brought close to the gear raw material 2. That is, the tooth tips of the tooth parts 2a of the gear raw material 2 immediately after the rolling processing by the rolling machine 4 is started are not brought into contact with the tooth bottoms 7b of the first rolling die 7 and the tooth bottoms 8b of the second rolling die 8.

The material of the tooth part 2a flows to the tooth tip side when the rolling processing is performed on the tooth parts 2a of the gear raw material 2. However, when the tooth tips of the tooth parts 2a are brought into contact with the tooth bottoms 7b of the first rolling die 7 and the tooth bottoms 8b of the second rolling die 8 immediately after the rolling processing by the rolling machine 4 is started, the first rolling die 7 and the second rolling die 8 are pushed, and a load is generated.

In this embodiment, as described above, the first rolling die 7 and the second rolling die 8 are formed in such a way that the tooth tips of the tooth parts 2a of the gear raw material 2 immediately after the rolling processing by the rolling machine 4 is started are not brought into contact with the tooth bottoms 7b of the first rolling die 7 and the tooth bottoms 8b of the second rolling die 8. Thus, the tooth tips of the tooth parts 2a of the gear raw material 2 are not brought into contact with the tooth bottoms 7b of the first rolling die 7 and the tooth bottoms 8b of the second rolling die 8 at the initial stage of the rolling processing by the rolling machine 4. This reduces the load on the first rolling die 7 and the second rolling die 8.

By the way, as the rolling processing progresses, the material of the tooth parts 2a of the gear raw material 2 flows to the tooth tip side, and the tooth tips of the tooth parts 2a are brought into contact with the tooth bottoms 7b of the first rolling die 7 and the tooth bottoms 8b of the second rolling die 8 and then rolled.

Second Embodiment

Figure 9:
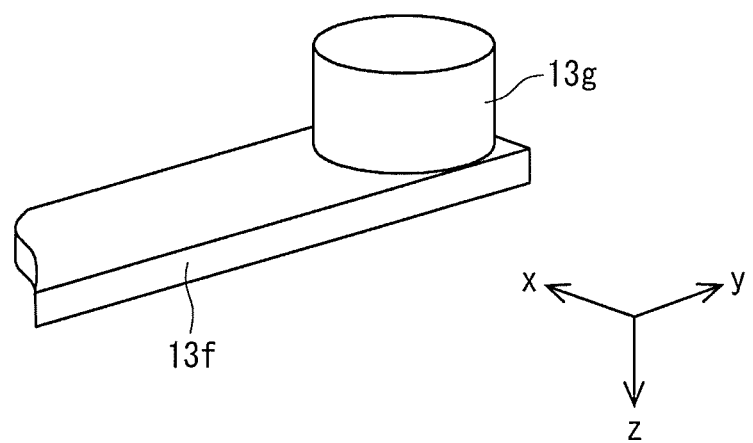
FIG. 9 is a perspective view showing an example of a periphery of a protrusion unit of a pressing machine according to a second embodiment.

The protrusion units 13g and 14g according to the first embodiment are rectangular when viewed from the Z-axis direction. Alternatively, the protrusion units 13g and 14b may be, as shown in FIG. 9, substantially circular when viewed from the Z-axis direction. However, the protrusion units 13g and 14g may have any shape as long as they can press the region B including the region A in which the internal density of the tooth parts 2a decreases when at least the rolling processing is performed on the tooth parts 2a of the gear raw material 2 at a preset depth. FIG. 9 shows an example of one protrusion unit.

Third Embodiment

Figure 10:
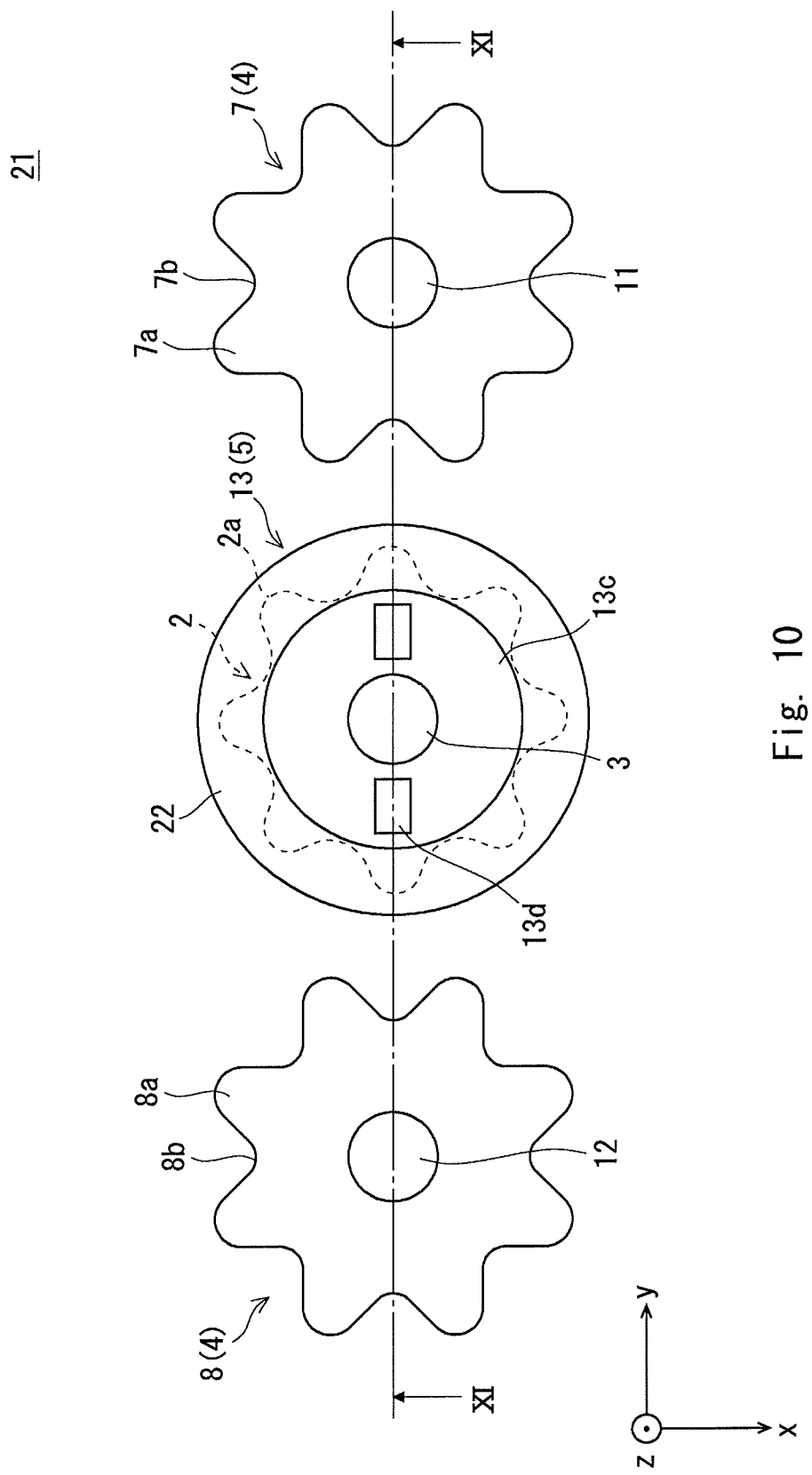
FIG. 10 is a plan view schematically showing an apparatus for manufacturing a gear according to a third embodiment.
Figure 11:
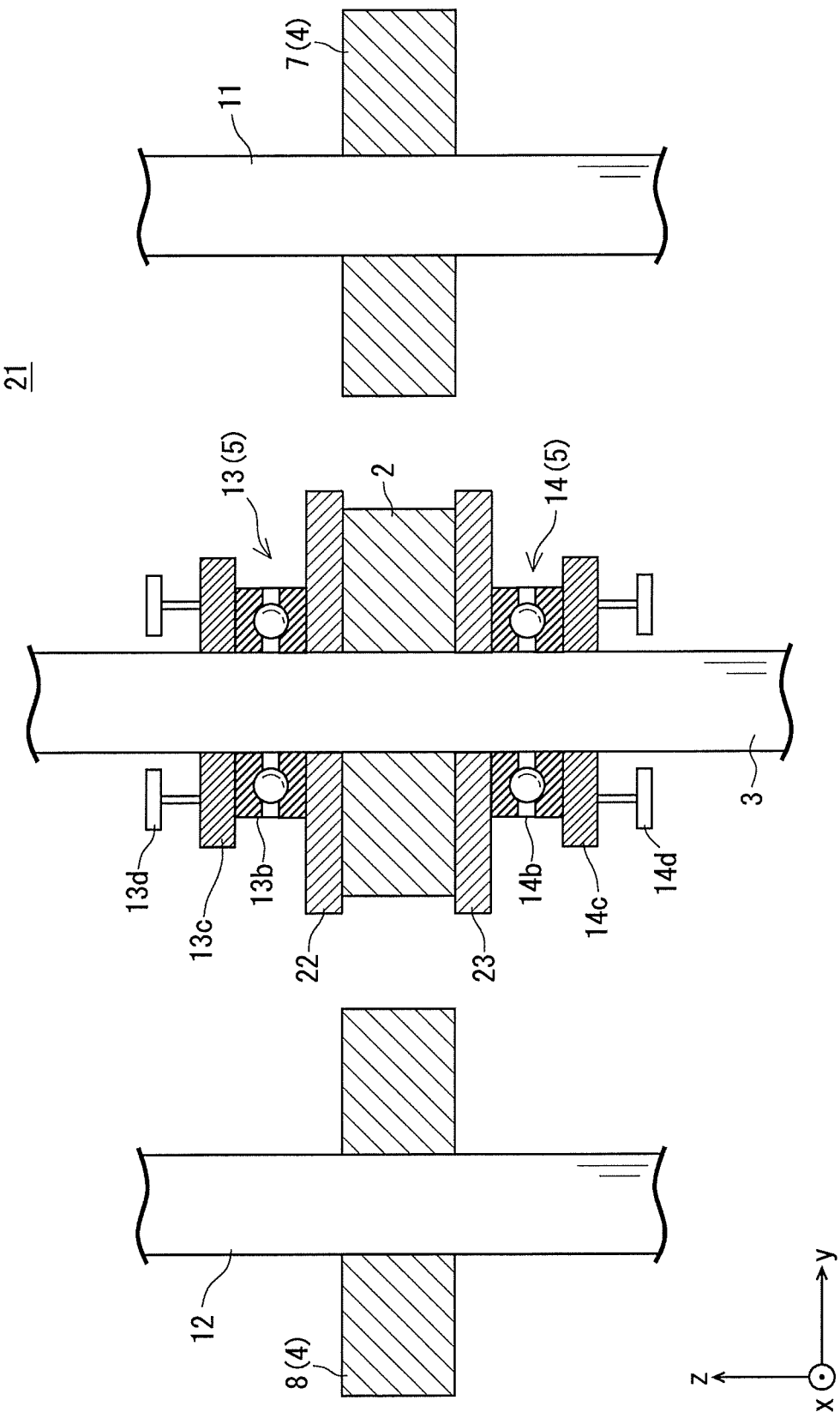
FIG. 11 is a partial cross-sectional view taken along the line XI-XI of FIG. 10.
Figure 12:
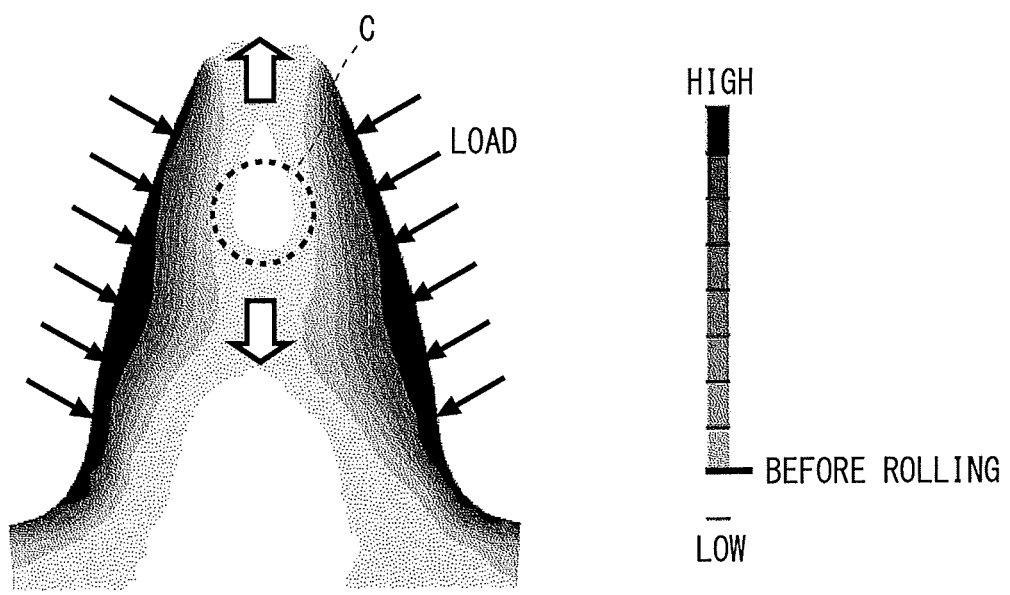
FIG. 12 is a view showing a density of a rolled tooth part of the gear raw material.

In the first embodiment, the region B including the region A, in which the internal density of the tooth parts 2a decreases when at least the rolling processing is performed on the tooth parts 2a of the gear raw material 2, is pressed. However, the present disclosure is not limited to this. FIG. 10 is a plan view schematically showing an apparatus for manufacturing a gear according to this embodiment. FIG. 11 is a partial cross-sectional view taken along the line XI-XI of FIG. 10. The method and apparatus for manufacturing a gear according to this embodiment are substantially equal to the method and apparatus for manufacturing a gear according to the first embodiment, and thus repeated descriptions will be omitted, and the same members are denoted by the same reference numerals.

A manufacturing apparatus 21 according to this embodiment includes pressing plates 22 and 23 instead of the punching units 13a and 14a according to the first embodiment. That is, the manufacturing apparatus 21 is configured to sandwich the gear raw material 2 between the pressing plates 22 and 23 in the Z-axis direction. The pressing plates 22 and 23 each have an area which overlaps at least the entire region of the gear raw material 2 when viewed from the Z-axis direction. The surfaces of the pressing plates 22 and 23 that are brought into contact with the gear raw material 2 are formed substantially flat.

Then, the area A in which the internal density of the tooth parts 2a of the gear raw material 2 decreases can be pressed by the pressing plates 22 and 23 when the rolling processing is performed. Thus, like the first embodiment, it is possible to effectively prevent the density of the region A from decreasing and consequently a crack from occurring inside the tooth parts 2a when the rolling processing is performed on the tooth parts 2a of the gear raw material 2. Moreover, in this embodiment, the entire area of the tooth part 2a of the gear raw material 2 is pressed by the pressing plates 22 and 23 in the Z-axis direction, and thus a gear having no local recess can be manufactured.

The present disclosure is not limited to the above-described embodiments, and can be changed as appropriate without departing from the spirit of the present disclosure.

For example, in the above-described embodiments, the tooth parts 2a of the gear raw material 2 are pressed in the Z-axis direction. However, it is only necessary if a component in the Z-axis direction is included in the pressing force of the first pressing unit 13 and the second pressing unit 14. In short, it is only necessary to press the region A in which the internal density of the tooth part 2a decreases when the rolling processing is performed on the tooth parts 2a of the gear raw material 2.

For example, in the above-described embodiments, the first pressing unit 13 and the second pressing unit 14 press the tooth parts 2a of the gear raw material 2. Alternatively, one of the pressing units may be fixed. Further, the pressing unit according to the first embodiment and the pressing unit according to the second embodiment may be combined.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:
1. A method for manufacturing a gear by performing rolling processing on a tooth part of a sintered gear raw material, the method comprising:
   pressing the gear raw material toward a center of rotation of the gear raw material by a rolling machine when the rolling processing is performed on the tooth part of the gear raw material;
   pressing a region where an internal density of the tooth part of the gear raw material decreases at a preset depth when at least the rolling processing is performed on the tooth part of the gear raw material toward a center of a thickness thereof by a pressing machine; and
   applying the pressing force of the pressing machine to a center position of a tooth height of the tooth part of the gear raw material so that a density at the center position of the tooth height of the tooth part of the gear raw material is higher than a preset target density.
2. The method according to claim 1, wherein a pressing force by the pressing machine is applied to one side of a surface of the gear raw material in a thickness direction and another side of the surface of the gear raw material in the thickness direction in such a way that the gear raw material is sandwiched therebetween.

* * * * *